United States Patent
Kim et al.

(10) Patent No.: US 9,548,078 B2
(45) Date of Patent: Jan. 17, 2017

(54) METHOD FOR DETERMINING BIT RATE AND APPARATUS THEREFOR

(71) Applicant: CENTER FOR INTEGRATED SMART SENSORS FOUNDATION, Daejeon (KR)

(72) Inventors: Giwon Kim, Seoul (KR); Chong-Min Kyung, Daejeon (KR)

(73) Assignee: CENTER FOR INTEGRATED SMART SENSORS FOUNDATION, Daejeon (KR)

(*) Notice: Subject to any disclaimer, the term of this patent is extended or adjusted under 35 U.S.C. 154(b) by 0 days.

(21) Appl. No.: 14/764,527

(22) PCT Filed: Jan. 29, 2014

(86) PCT No.: PCT/KR2014/000829
§ 371 (c)(1),
(2) Date: Jul. 29, 2015

(87) PCT Pub. No.: WO2014/119917
PCT Pub. Date: Aug. 7, 2014

(65) Prior Publication Data
US 2015/0380049 A1  Dec. 31, 2015

(30) Foreign Application Priority Data
Jan. 30, 2013 (KR) .................. 10-2013-0010332

(51) Int. Cl.
*H04N 5/94* (2006.01)
*H04N 9/88* (2006.01)
(Continued)

(52) U.S. Cl.
CPC ..... *G11B 20/10268* (2013.01); *G06K 9/00711* (2013.01); *G11B 20/00007* (2013.01);
(Continued)

(58) Field of Classification Search
CPC .............. G06K 9/00711; G11B 20/00007; G11B 20/10268; G11B 20/10287; H04N 19/146; H04N 19/147; H04N 19/15; H04N 5/23241; H04N 7/18
(Continued)

(56) References Cited

U.S. PATENT DOCUMENTS

2014/0211842 A1* 7/2014 Zhao ................ H04N 19/00175
375/240.02

FOREIGN PATENT DOCUMENTS

| KR | 10-2009-0036765 A | 4/2009 |
| KR | 10-2010-0113365 A | 10/2010 |
| KR | 10-2011-0099554 A | 9/2011 |

OTHER PUBLICATIONS

Kim et al., "Event Statistics and Criticality-Aware Bitrate Allocation to Minimize Energy Consumption of Memory-Constrained Wireless Surveillance System," 2010 IEEE International Conference on Multimedia and Expo (ICME), Jul. 19-23, 2010, Suntec City, Singapore, pp. 7-12.

(Continued)

*Primary Examiner* — Robert Chevalier
(74) *Attorney, Agent, or Firm* — Seed IP Law Group LLP

(57) ABSTRACT

The present invention relates to a method for controlling a bit rate and an apparatus therefor, and more specifically to an apparatus for storing a bit rate changed according to a significant level in a memory and a method for determining the bit rate, which meets the requirements for the distortion according to the memory space limitation and the significant level of the image information so as to minimize the energy consumption.

8 Claims, 3 Drawing Sheets

(51) Int. Cl.
  *G11B 20/10*   (2006.01)
  *H04N 19/147*   (2014.01)
  *H04N 19/15*   (2014.01)
  *H04N 19/146*   (2014.01)
  *G06K 9/00*   (2006.01)
  *G11B 20/00*   (2006.01)
  *H04N 7/18*   (2006.01)
  *H04N 5/232*   (2006.01)

(52) U.S. Cl.
  CPC ......... *G11B 20/10287* (2013.01); *H04N 7/18* (2013.01); *H04N 19/146* (2014.11); *H04N 19/147* (2014.11); *H04N 19/15* (2014.11); *G06K 2009/00738* (2013.01); *G11B 2020/00072* (2013.01); *H04N 5/23241* (2013.01)

(58) Field of Classification Search
  USPC ........ 386/277, 264, 263, 226, 224, 326, 328
  See application file for complete search history.

(56) References Cited

OTHER PUBLICATIONS

Kim et al., "Energy-Aware Operation of Black Box Surveillance Cameras under Event Uncertainty and Memory Constraint," 2012 IEEE International Conference on Multimedia and Expo (ICME), Jul. 9-13, 2012, Melbourne, Australia, pp. 782-787.
International Search Report, mailed May 12, 2014, for PCT/KR2014/000829, 5 pages (incl. English translation).

\* cited by examiner

METHOD FOR DETERMINING BIT RATE AND APPARATUS THEREFOR

BACKGROUND

Technical Field

The present application relates to a method for controlling a bit rate and an apparatus therefor, and more specifically to an apparatus, which stores a bit rate varied according to a significance level in a memory, and a method for determining a bit rate.

Description of the Related Art

As a social interest in a security increases, demands on a black box monitoring camera or a security camera becomes higher.

A main function of a device for obtaining image information on a predetermined area detects an event such as appearance or a suspected object in a camera area and compresses and stores data according to image information which is obtained until the event is terminated.

Because the device for obtaining image information receives power from a battery (e.g., a security camera operated by a battery of a vehicle when the vehicle is parked during a few weeks), a reduction in energy consumption is one of the most important issues.

FIG. 1 is a block diagram illustrating a conventional device satisfying such a main function. Referring to FIG. 1, a conventional device 100 may operate in an event-driven manner to protect energy consumption according to storage of a frame including less important information.

That is, other function blocks except for an event detector 120 are generally power-gated and wake up and operate whenever the event detector 120 detects an event.

A significance level of image information obtained when an event lasts is variable. For example, a significance level of image information including a face image is higher than that of image information including the back of his/her head.

The significance level is measured through various algorithms such as background subtraction, face detection and recognition, object tracking, behavior analysis, and the like.

A result of the measured significance level is used to adjust video encoding of a video encoder 140 (e.g., a manner of encoding image information having a high significance level using high image quality).

Generally, an encoding configuration with a high bit rate and low compression efficiency of an encoding frame needs power consumption units of which the number is smaller than that with high compression efficiency.

However, as a bit rate of an encoder increases, the energy consumption needed to store encoded image information in a memory increases.

That is, there is an energy trade-off on a video encoding configuration.

Furthermore, a memory embedded in an imaging device has a limited memory space to reduce the cost of the imaging device overall.

Accordingly, determination of a bit rate for encoding has to satisfy a restriction on a memory space in order to consider such constraints.

The encoding bit rate for minimizing energy depends on an event behavior specified by frequency of event occurrence and duration.

However, because the event behavior is nondeterministic and non-static, a time-driven encoding bit rate configuration according to the predetermined event behavior is inaccurate and inefficient.

BRIEF SUMMARY

The present disclosure is directed to providing a bit rate determining method and apparatus, capable of minimizing energy consumption by satisfying a restriction on a memory space and an image distortion requirement according to a significance level of image information.

According to an exemplary embodiment of the inventive concept, a method is provided which determines a bit rate corresponding to a first significance level by an imaging device which stores image information using a bit rate varied according to a significance level. The method may include allocating a memory space for storing obtained image information, determining a bit rate corresponding to the first significance level, the bit rate satisfying a distortion requirement according to the first significance level and making energy consumption minimized when image information having the first significance level is stored, determining whether to exceed the allocated memory space, when image information is processed according to the determined bit rate, and if the allocated memory space is determined as exceeding a size of the processed image information, calculating a bit rate of to a second significance level, which makes a change in energy consumption minimized when the bit rate is lowered, to lower the bit rate of the second significance level.

The determining of the bit rate may include determining a bit rate in which a sum of energy consumption for video encoding of image information having the first significance level and energy consumption for memory storage is minimized, as the bit rate corresponding to the first significance level.

The method may further include again performing the determining of whether to exceed the allocated memory space, after the lowering of the bit rate. A bit rate may be determined if a size of image information processed according to a bit rate corresponding to the second significance level satisfies the allocated memory space, and the lowering of the bit rate may be again performed if the size of the processed image information exceeds the allocated memory space.

The image information may be image information obtained in a divided time area. The method may further include predicting a probability that image information having the first significance level in the divided time area occurs, and the determining of the bit rate may include determining whether to exceed the allocated memory space according to the predicted probability.

According to an exemplary embodiment of the inventive concept, an imaging device is provided which obtains image information and stores the obtained image information using a bit rate varied according to a significance level of the obtained image information in a memory. The imaging device may include a memory space determination unit configured to allocate a memory space on the memory at which image information obtained in a divided time area is stored, and a bit rate determination unit configured to determine a bit rate corresponding to a first significance level in consideration of the memory space allocated by the memory space determination unit.

The bit rate determination unit may determine a bit rate of the first significance level which satisfies a distortion requirement according to the first significance level and makes energy consumption minimized when image information having the first significance level is stored, and if a size of image information processed according to the determined bit rate exceeds the allocated memory space, the bit rate determination unit may calculate a bit rate of a second significance level which makes a change in energy consumption minimized when the bit rate is lowered, to lower the bit rate of the second significance level.

The imaging device may further include an event occurrence prediction unit configured to predict a probability that image information having the first significance level in the divided time area occurs, and the bit rate determination unit may determine whether to exceed the allocated memory space according to the probability predicted by the event occurrence prediction unit.

The details of other embodiments may be included in the detailed description and drawings.

According to an exemplary embodiment of the inventive concept, it may be possible to minimize energy consumption by satisfying an image distortion requirement according to the restriction on a memory space and a significance level of image information.

DETAILED DESCRIPTION

Advantage points and features of the present invention and a method of accomplishing thereof will become apparent from the following description with reference to the following figures, wherein embodiments will be described in detail with reference to the accompanying drawings. Embodiments of the present invention, however, may be embodied in various different forms, and should not be construed as being limited only to the illustrated embodiments. Rather, these embodiments are provided as examples so that this present invention will be thorough and complete, and will fully convey the concept of the present invention to those skilled in the art. The present invention may be defined by scope of the claims. Meanwhile, the terminology used herein to describe embodiments of the invention is not intended to limit the scope of the invention.

Figure 1:
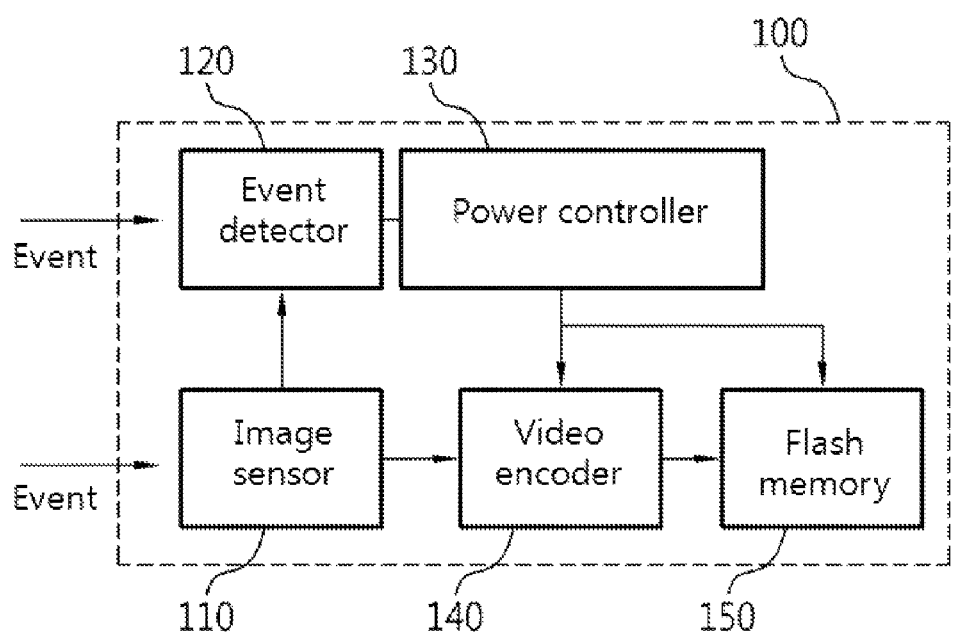
FIG. 1 is a block diagram of a conventional image device operating in an event-driven manner.
Figure 2:
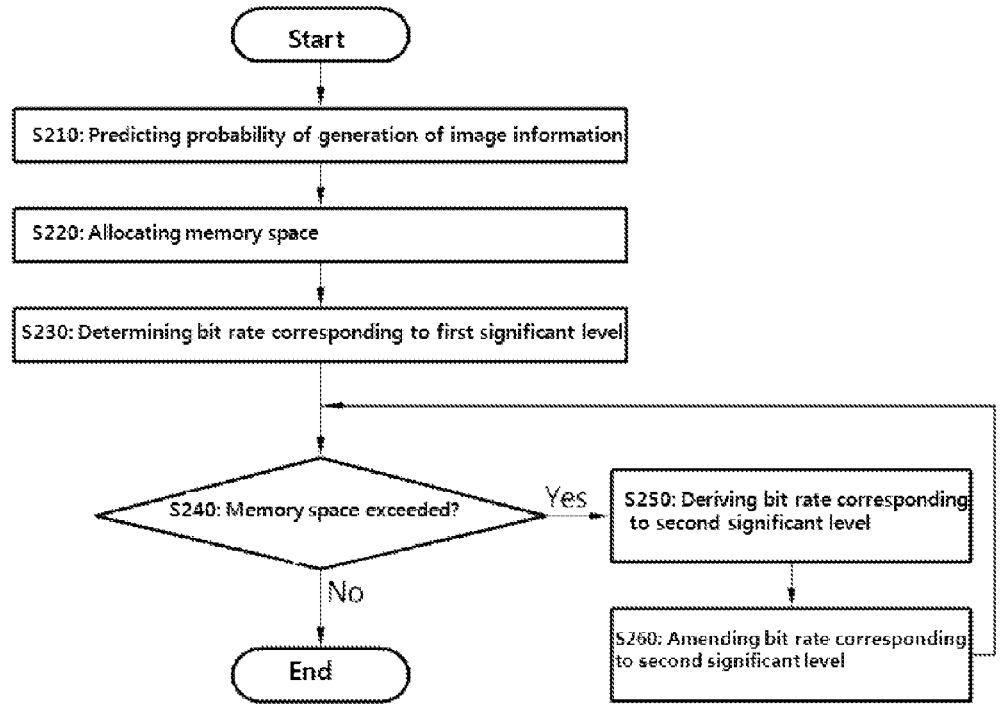
FIG. 2 is a flow chart of a bit rate determination method according to an embodiment of the present invention.

FIG. 2 is a flow chart of a bit rate determination method according to an embodiment of the present invention. Referring to FIG. 2, a bit rate determination method according to an embodiment of the present invention may include allocating a memory space (S220), determining a bit rate (S230), determining whether to satisfy a restriction on a memory space (S240), and correcting the bit rate (S250, S260).

In the allocating (S220), there may be allocated a specific memory space on a memory where image information captured by an imaging device is to be stored.

According to an embodiment of the present invention, the imaging device may divide a time area and may allocate a memory space by the divided time area.

Favorably, allocation of the memory space may be accomplished according to the following equation.

$$c_i = (B_i / (N r_1 - i + 1))$$

Here, i may denote an order in the divided time area. $N_r$ may denote the total number of divided time areas. (i.e., i is an integer number between one and $N_r$.)

$B_i$ may denote a remaining memory space in an i-th time area and may mean a memory space where $c_i$ is allocated.

According to an embodiment of the present invention, the bit rate determination method may further include predicting a probability that image information having a first signification level occurs in a divided time area (S210).

Favorably, the predicted image information occurrence probability may be expressed by: $Wi=\{w_{i,1}, w_{i,2}, w_{i,3}, \ldots, w_{i,Ns}\}$. $w_i$ may be a set of image information occurrence probabilities in the i-th time area. $w_{i,j}$ may mean a probability that image information having a significance level of j in the i-th time area occurs.

In the determining (S230), an imaging device may determine a bit rate corresponding to a specific significance level. In the determining (S230), the imaging device may determine a bit rate which satisfies a distortion requirement level according to each significance level and makes energy consumption minimized.

According to an embodiment of the present invention, the determining of the bit rate (S230) may include determining the bit rate, in which a sum of energy consumption for video encoding of image information having a specific significance level and energy consumption for memory storage is minimized, as a bit rate corresponding to the specific significance level.

Figure 3:
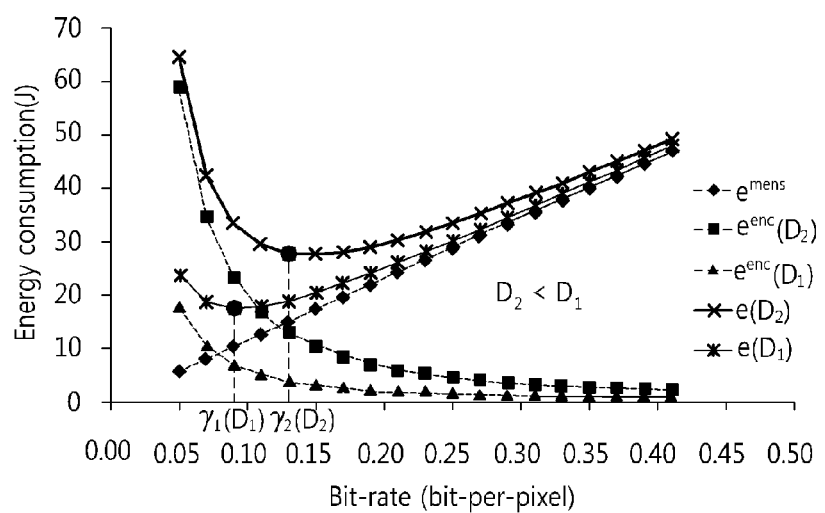
FIG. 3 is a graph illustrating a change in energy consumption according to a bit rate.

FIG. 3 is a graph illustrating a change in energy consumption according to a bit rate. As illustrated in FIG. 3, as a bit rate increases, energy consumption $e^{enc}(D2)$ for video encoding may decrease, and energy consumption $e^{mem}$ for memory storage may increase. Accordingly, in the determining (S230), there may be determined a bit rate $r_2(D_2)$, in which a sum of energy consumption $e^{enc}(D_2)$ for video encoding and energy consumption $e^{mem}$ for memory storage is minimized, as a bit rate corresponding to a specific significance level.

Returning to FIG. 2, favorably, in the determining (S230), there may be calculated and stored a bit rate for each significance level with respect to each time area. That is, when a distortion requirement level according to the significance level is provided, an energy-minimizing bit rate in a prescribed time area may be calculated. Accordingly, information thus calculated and stored may be used.

In the determining (S240), whether to exceed a memory space allocated in the allocating (S220) may be determined when the imaging device performs processing using a bit rate determined in the determining (S230).

If the bit rate is determined, a required memory space may be calculated by multiplying the number of bits to be processed and the determined bit rate, and whether to exceed a memory space may be determined by comparing the allocated memory space and the calculated memory space.

Favorably, in the determining (S240), whether to satisfy the restriction on the memory space may be determined according to the following equation calculated by the imaging device.

$$\sum_{j=1}^{Ns} bi, j(ri, j) > c_i$$

Here, $c_i$ may denote an allocated memory space. Ns may denote the number of significance levels. ri,j may be a value determined as a bit rate corresponding to image information having a significance level of j in the i-th time area. bi,j may denote the number of bits which are image information having the significance level of j in the i-th time area.

Here, bi,j may be calculated through the following equation.

$$b_{i,j} = fps_j * n^w_j * n^H_j * r_{i,j} * (w_{i,j} * tr)$$

$fps_j$ may indicate the number of frames per second of image information having the significance level of j. $w_{i,j}$ may indicate a probability that image information having a significance level of j in the i-th time area occurs. tr may be a length of a divided time area. $n^w_j$ may be a width of image information having a significance level of j. $n^H_j$ may be a height of image information having a significance level of j.

If the restriction on a memory space allocated in the determining of whether to satisfy the restriction on the memory space (S240) is satisfied, the bit rate determined in the determining of the bit rate (S230) may be selected and the process may be terminated.

If the restriction on a memory space allocated in the determining (S240) is not satisfied, the correcting of the bit rate (S250, S260) may be performed.

In the correcting of the bit rate (S250, S260), there may be calculated a bit rate of a specific significance level in which energy consumption variation is minimized, and the calculated bit rate corresponding to the specific significance level may be lowered. Whether to satisfy a restriction on the memory space may be again performed according to the lowered bit rate.

Favorably, the correcting of the bit rate (S250, S260) may include calculating a specific significance level (j*) in which a change in energy consumption is minimized when a bit rate is lowered (S250) and lowering the calculated bit rate corresponding to the significance level (j*) (S260).

In the calculating of the significance level of j* (S250), the smallest value of j may be calculated as j* through the following equation.

$$\Delta e_{i,j}(r_{i,j}, d_{i,j}) = e_{i,j}(r_{i,j} - \Delta r, d_{i,j}) - e_{i,j}(r_{i,j}, d_{i,j})$$

Xr may be a difference of bit rates varied by lowering a bit rate. $r_{i,j}$ may be a bit rate corresponding to image information having a significance level of j in a i-th time area. $d_{i,j}$ may be a mean distortion requirement level on the image information having a significance level of j in a i-th time area. $e_{i,j}(A,B)$ may be energy consumed to process image information which has a bit rate of A and a distortion requirement level of B and has a significance level of j in a i-th time area. That is, $Xe_{i,j}(A, B)$ may mean energy consumption which is varied when the bit rate corresponding to the image information having a significance level of j in a i-th time area is lowered as many as a level (i.e., it is assumed that the bit rate is discretely determined).

According to an exemplary embodiment of the inventive concept, it may be possible to determine a bit rate which satisfies a restriction on a memory space and minimizes energy consumption.

Figure 4:
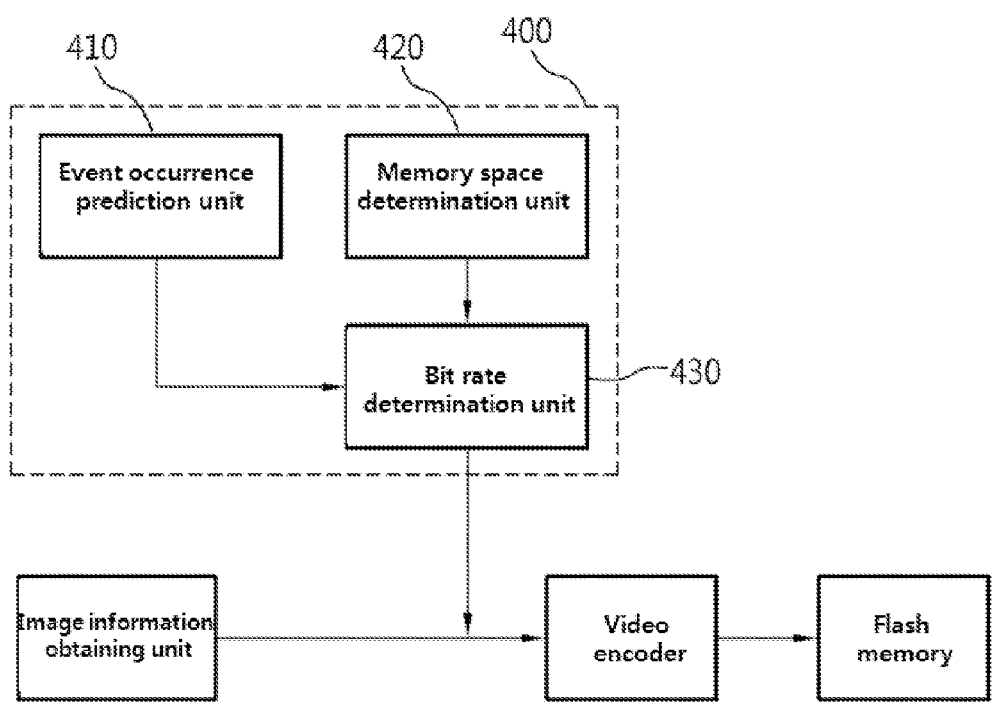
FIG. 4 is a block diagram of an imaging device according to an embodiment of the present invention.

FIG. 4 is a block diagram of an imaging device according to an embodiment of the present invention. Referring to FIG. 4, an imaging device according to an embodiment of the present invention may have a control unit 400 which includes a memory space determination unit 420 for allocating a memory space on a memory at which image information obtained in a divided time area is stored and a bit rate determination unit 430 for determining a bit rate corresponding to a specific significance level according to the allocated memory space.

According to an embodiment of the present invention, the imaging device may further include an event occurrence prediction unit 410 for predicting a probability that the image information having a specific significance level occurs in a divided time area.

The event occurrence prediction unit 410 may predict the probability that the image information having a specific significance level occurs in a divided time area, as described with reference to FIG. 2.

The memory space determination unit 420 may allocate a memory space at which image information obtained in a divided time area is stored, as described with reference to FIG. 2.

The bit rate determination unit 430 may determine a bit rate corresponding to a specific significance level as described with reference to FIG. 2.

As described above, the imaging device according to an embodiment of the present invention may encode image information obtained from an image information obtaining unit under a control of the control unit 400 and may store the encoded image information in a memory, thereby making it possible to satisfy a restriction on a memory space and to minimize energy consumption.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

The invention claimed is:

1. A method of determining a bit rate corresponding to a first significance level by an imaging device which stores image information using a bit rate varied according to a significance level, the method comprising:
    allocating a memory space for storing obtained image information;
    determining a bit rate corresponding to the first significance level, the bit rate satisfying a distortion requirement according to the first significance level and making energy consumption minimized when image information having the first significance level is stored;
    determining whether to exceed the allocated memory space, when image information is processed according to the determined bit rate; and
    if the allocated memory space is determined as exceeding a size of the processed image information, calculating a bit rate of to a second significance level, which makes a change in energy consumption minimized when the bit rate is lowered, to lower the bit rate of the second significance level.

2. The method of claim 1, wherein the determining of the bit rate comprises:
    determining a bit rate in which a sum of energy consumption for video encoding of image information having the first significance level and energy consumption for memory storage is minimized, as the bit rate corresponding to the first significance level.

3. The method of claim 1, further comprising:
    again performing the determining of whether to exceed the allocated memory space, after the lowering of the bit rate,
    wherein a bit rate is determined if a size of image information processed according to a bit rate corresponding to the second significance level satisfies the allocated memory space, and wherein the lowering of the bit rate is again performed if the size of the processed image information exceeds the allocated memory space.

4. The method of claim 1, wherein the image information is image information obtained in a divided time area, further comprising:
predicting a probability that image information having the first significance level in the divided time area occurs, and
wherein the determining of the bit rate comprises:
determining whether to exceed the allocated memory space according to the predicted probability.

5. An imaging device which obtains image information and stores the obtained image information using a bit rate varied according to a significance level of the obtained image information in a memory, the imaging device comprising:
a memory space determination unit configured to allocate a memory space on the memory at which image information obtained in a divided time area is stored; and
a bit rate determination unit configured to determine a bit rate corresponding to a first significance level in consideration of the memory space allocated by the memory space determination unit,
wherein the bit rate determination unit determines a bit rate of the first significance level which satisfies a distortion requirement according to the first significance level and makes energy consumption minimized when image information having the first significance level is stored, and
wherein if a size of image information processed according to the determined bit rate exceeds the allocated memory space, the but rate determination unit calculated a bit rate of a second significance level which makes a change in energy consumption minimized when the bit rate is lowered, to lower the bit rate of the second significance level.

6. The imaging device of claim 5, further comprising:
an event occurrence prediction unit configured to predict a probability that image information having the first significance level in the divided time area occurs, and
wherein the bit rate determination unit determines whether to exceed the allocated memory space according to the probability predicted by the event occurrence prediction unit.

7. A method of processing image information, comprising:
allocating a memory space for storing obtained image information;
determining a size of the image information according to energy consumption when the image information having a predetermined significance level is stored;
determining, when image information having a predetermined significance level is processed, whether a size of the processed image information exceeds the allocated memory space; and
adjusting the size of the processed image information according to the determination result.

8. The method of claim 7, wherein the adjusting comprises:
adjusting the size of the processed image information according to a change in energy consumption generated when the size of the image information is adjusted.

* * * * *

UNITED STATES PATENT AND TRADEMARK OFFICE
CERTIFICATE OF CORRECTION

PATENT NO.         : 9,548,078 B2
APPLICATION NO.    : 14/764527
DATED              : January 17, 2017
INVENTOR(S)        : Giwon Kim et al.

Page 1 of 1

It is certified that error appears in the above-identified patent and that said Letters Patent is hereby corrected as shown below:

In the Claims

Column 8, Line 1:
"memory space, the but rate determination unit calculated"
Should read:
--memory space, the bit rate determination unit calculated--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*